United States Patent
Hayashi et al.

(10) Patent No.: US 9,125,023 B2
(45) Date of Patent: Sep. 1, 2015

(54) COMMUNICATION SYSTEM, COMMUNICATION DEVICE MOUNTED IN VEHICLE, AND SWITCHING APPARATUS

(75) Inventors: Keisaku Hayashi, Anjo (JP); Yasunori Kanno, Obu (JP)

(73) Assignee: DENSO CORPORATION, Kariya (JP)

( * ) Notice: Subject to any disclaimer, the term of this patent is extended or adjusted under 35 U.S.C. 154(b) by 1010 days.

(21) Appl. No.: 13/238,325

(22) Filed: Sep. 21, 2011

(65) Prior Publication Data

US 2012/0077471 A1 Mar. 29, 2012

(30) Foreign Application Priority Data

Sep. 24, 2010 (JP) ................... 2010-214160

(51) Int. Cl.
| | |
|---|---|
| H04W 4/04 | (2009.01) |
| H04M 3/436 | (2006.01) |
| H04W 4/00 | (2009.01) |
| H04W 4/16 | (2009.01) |
| H04M 3/36 | (2006.01) |
| H04M 3/42 | (2006.01) |

(52) U.S. Cl.
CPC .............. *H04W 4/046* (2013.01); *H04M 3/436* (2013.01); *H04W 4/008* (2013.01); *H04W 4/16* (2013.01); *H04M 3/367* (2013.01); *H04M 3/42212* (2013.01)

(58) Field of Classification Search
CPC ..... H04W 4/027; H04W 4/028; H04W 4/046; H04W 4/16; H04W 4/06; H04W 4/04; H04W 4/43; H04M 2242/30
USPC ......... 455/410, 411, 418, 419, 456.4
See application file for complete search history.

(56) References Cited

U.S. PATENT DOCUMENTS

| | | | | |
|---|---|---|---|---|
| 2002/0128000 | A1* | 9/2002 | do Nascimento, Jr. | 455/414 |
| 2005/0030184 | A1 | 2/2005 | Victor | |
| 2008/0057942 | A1* | 3/2008 | Woods et al. | 455/425 |
| 2011/0050460 | A1* | 3/2011 | Bruns et al. | 340/905 |

FOREIGN PATENT DOCUMENTS

| | | |
|---|---|---|
| JP | A-2000-270051 | 9/2000 |
| JP | A-2001-144850 | 5/2001 |
| JP | A-2001-251670 | 9/2001 |
| JP | A-2002-64852 | 2/2002 |
| JP | A-2006-109033 | 4/2006 |

(Continued)

OTHER PUBLICATIONS

Office Action mailed Jul. 17, 2012 in corresponding JP Application No. 2010-214160 (and English translation).

*Primary Examiner* — Rafael Pérez-Gutiérrez
*Assistant Examiner* — Joshua Schwartz
(74) *Attorney, Agent, or Firm* — Posz Law Group, PLC

(57) ABSTRACT

In a communication system for conducting wireless communication between communication units mounted in vehicles, workload information indicating a workload of a driver of each vehicle is generated. When a communication request for requesting communication is transmitted from the communication unit of a first vehicle, it is determined whether the workload of a driver of the first vehicle and the workload of a driver of a second vehicle are lower than a predetermined level. When the workload of the driver of the first vehicle and the workload of the driver of the second vehicle are determined lower than the predetermined level, an incoming call is notified to the driver of the second vehicle.

9 Claims, 7 Drawing Sheets

(56) References Cited

FOREIGN PATENT DOCUMENTS

| JP | A-2006-254055 | 9/2006 |
| JP | A-2008-82940 | 4/2008 |
| JP | A-2009-118241 | 5/2009 |
| JP | A-2009-147400 | 7/2009 |
| JP | A-2009-232073 | 10/2009 |

* cited by examiner

PERIOD WHERE WORKLOADS OF
BOTH TRANSMITTING AND
RECEIVING VEHICLES ARE LOW

PERIOD WHERE WORKLOADS OF
BOTH TRANSMITTING AND
RECEIVING VEHICLES ARE LOW

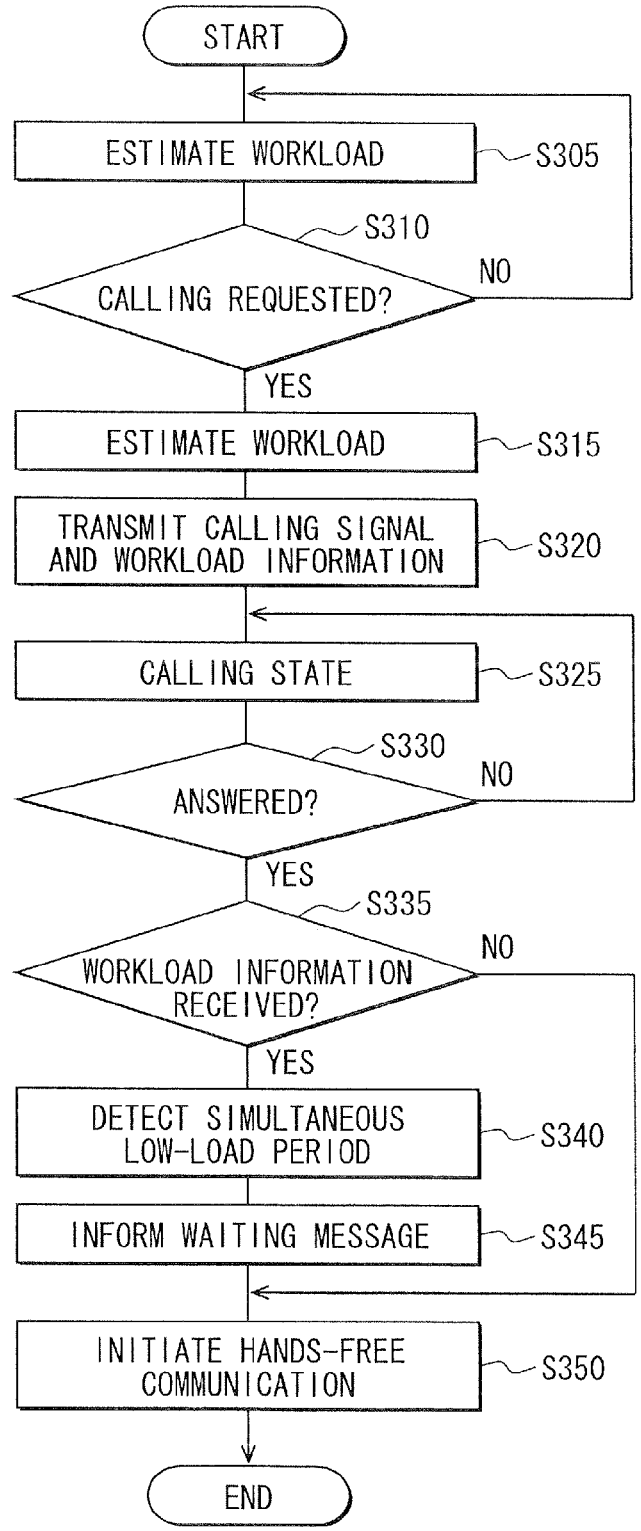

⟨RECEIVING PROCESSING⟩

COMMUNICATION SYSTEM, COMMUNICATION DEVICE MOUNTED IN VEHICLE, AND SWITCHING APPARATUS

CROSS REFERENCE TO RELATED APPLICATION

This application is based on Japanese Patent Application No. 2010-214160 filed on Sep. 24, 2010, the disclosure of which is incorporated herein by reference.

FIELD OF THE INVENTION

The present invention relates to a communication system for conducting communication utilizing a wireless communication line. More particularly, the present invention relates to a communication system, a communication device mounted in a vehicle, and a switching apparatus for permitting initiation of communication between communication terminals.

BACKGROUND OF THE INVENTION

A hands-free device for a vehicle, which enables a driver to communicate with another person using a speaker of a vehicle audio system and a microphone installed in a passenger compartment, has been known. By using the hands-free device, a driver can talk with another person without holding a cell phone in his hand.

In general, a driver needs to pay more attention when turning at a traffic intersection, changing a lane and the like than when driving straight ahead. In such a situation, it may be difficult to communicate safely even using the hands-free device.

For example, JP2008-82940A describes a navigation system that estimates a workload (e.g., perception load) of a driver based on a scheduled travel route of a vehicle and provides the driver with various information at a timing where the workload is low. Such a system may be employed to a hands-free device mounted in a vehicle. If a cell phone has an incoming call while the driver's workload is high, that is, while the driver is in a driving situation paying more attention, it may be possible to delay a ring alert until the driver's workload becomes low. Thus, the driver may talk through a cell phone using the hands-free device in a good time where the workload is low.

In such a case, however, if a phone call is made from a cell phone of another driver (e.g., transmitting driver) who is driving another vehicle, the timing of ringing a ring alert is determined without considering a workload of the transmitting driver. Therefore, the transmitting driver may not talk in a good time.

SUMMARY OF THE INVENTION

According to an aspect, a communication system includes a first communication unit disposed in a first vehicle and a second communication unit disposed in a second vehicle for conducting wireless communication between the first vehicle and the second vehicle. The first communication unit includes a first workload information generating element that generates first workload information indicating a first workload that a first driver of the first vehicle undergoes when operating the first vehicle. The second communication unit includes a second workload information generating element that generates second workload information indicating a second workload that a second driver of the second vehicle undergoes when operating the second vehicle. The communication system further includes a workload state determining element and an incoming call notifying element. The workload state determining element determines whether or not the first workload and the second workload are lower than a predetermined level based on the first workload information and the second workload information, when the first communication unit generates a communication request for requesting communication with the second communication unit. The incoming call notifying element notifies the second driver of an incoming call on condition that the first workload and the second workload are determined lower than the predetermined level by the workload state determining element.

In such a construction, the incoming call is notified on condition that the first workload and the second workload are lower than the predetermined level. Therefore, communication between the first driver and the second driver is initiated in a good time for the first driver and the second driver.

For example, the workload state determining element may be used in a receiving communication unit that receives the communication requests. As another example, the workload state determining element may be used in a transmitting communication unit that transmits the communication requests. As further another example, the communication system may include a switching apparatus disposed external to the first communication unit and the second communication unit. The workload state determining element may be included in the switching apparatus to control initiation of communication between the first driver and the second driver.

For example, each of the first communication unit and the second communication unit may include a communication device mounted in a vehicle and a communication terminal connected to the communication device. The communication device may be distributed in a market as an individual device. Also, the switching apparatus may be distributed in a market as an individual apparatus.

According to a second aspect, a communication device, which is connected to a communication terminal when used in a vehicle, includes a workload information generating element and a workload information transmitting element. The workload information generating element generates the workload information based on correlation data indicating a correlation between a driving operation taken by a driver when the driver drives a vehicle along a predetermined route and a workload that the driver undergoes during the driving operation and planned travel route data of the vehicle. The workload information indicates a change in a workload of a driver that the driver undergoes when driving the vehicle along a planned travel route indicated by the planned travel route data. The workload information transmitting element permits the communication terminal to transmit the workload information generated by the workload information generating element to another communication terminal, when the communication terminal transmits a communication request to initiate communication with the another communication terminal.

According to a third aspect, a communication device, which is connected to a communication terminal when used in a vehicle, includes a workload information generating element, a workload information acquiring element, a low-load period detecting element, and an incoming call notifying element. The workload information generating element generates workload information based on correlation data indicating a correlation between a driving operation taken by a driver when the driver drives a vehicle along a predetermined route and a workload that the driver undergoes during the driving operation and planned travel route data regarding the first vehicle. The workload information indicates a change in a workload that the driver undergoes when driving the vehicle along a planned travel route indicated by the planned travel route data. The workload information acquiring element acquires a workload information regarding a driver of another vehicle via the communication terminal, when the communication terminal receives a communication request from a communication terminal of the another vehicle. The low-load period detecting element detects a simultaneous low-load period where the workload of the driver of the vehicle and the workload of the driver of the another vehicle are lower than a predetermined level. The incoming call notifying element notifies the driver of the vehicle of an incoming call on condition that the simultaneous low-load period arrives.

According to a fourth aspect, a communication device includes a workload information generating element and a workload information transmitting element. The communication device is connected to a communication terminal when used in a vehicle. Also, the communication device may be used in association with a switching apparatus to conduct wireless communication between the connected communication terminal and another communication terminal through the switching apparatus. The switching apparatus is disposed external to the vehicles and controls initiation of communication between communication terminals. The workload information generating element generates workload information based on correlation data indicating a correlation between a driving operation taken by a driver when the driver drives a vehicle along a predetermined route and a workload that the driver undergoes during the driving operation and planned travel route data of the vehicle. The workload information indicates a change in a workload of a driver that the driver undergoes when driving the vehicle along a planned travel route indicated by the planned travel route data. The workload information transmitting element permits the communication terminal to transmit the workload information generated by the workload information generating element to the switching apparatus.

According to a fifth aspect, a switching apparatus for initiating wireless communication between at least first and second communication terminals includes a workload information receiving element, a low-load period detecting element, and an initiation timing control element. The first communication terminal is connected to a first communication device mounted in a first vehicle, and the second communication terminal is connected to a second communication device mounted in a second vehicle. The workload information receiving element receives workload information generated in the first and second communication devices through the first and second communication terminals, respectively, the workload information indicating a change in a workload that a driver undergoes when operating a corresponding vehicle along a planned travel route. The low-load period detecting element detects a simultaneous low-load period where the workload of the first vehicle and the workload of the second vehicle are lower than a predetermined level based on the workload information received by the workload information receiving element, when receiving a communication request transmitted from the first communication terminal for requesting initiation of communication with the second communication terminal. The initiation timing control element transmits the communication request to the second communication terminal on condition that the simultaneous low-load period arrives.

According to a sixth aspect, a communication device includes a workload information generating element, a low-load period detecting element and a transmitting element. The communication device is connected to a communication terminal that conducts wireless communication with another communication terminal, when used in a vehicle. The workload information generating element generates workload information based on correlation data indicating a correlation between a driving operation taken by a driver when the driver drives a vehicle along a predetermined route and a workload that the driver undergoes during the driving operation and planned travel route data. The workload information indicates a change in a workload that a driver undergoes when operating the vehicle along a planned travel route indicated by the planned travel route data. The low-load period detecting element detects a low-load period where the workload of the driver is lower than a predetermined level, when an instruction to transmit a communication request for initiating communication with another communication terminal from the communication terminal is made. The transmitting element permits the communication terminal to transmit the communication request on condition that the low-load period arrives.

In such a configuration, the driver is permitted to make a phone call when the workload of the driver is lower than the predetermined level. Therefore, the driver can communicate in a good time.

BRIEF DESCRIPTION OF THE DRAWINGS

Other objects, features and advantages of the present invention will become more apparent from the following detailed description made with reference to the accompanying drawings, in which like pads are designated by like reference numbers and in which:

FIG. 3 is a flowchart illustrating a transmitting processing of the communication system according to the first embodiment;

DETAILED DESCRIPTION OF EXEMPLARY EMBODIMENTS

Hereinafter, exemplary embodiments will be described with reference to the drawings.

First Embodiment

[Structure]

Figure 1A:
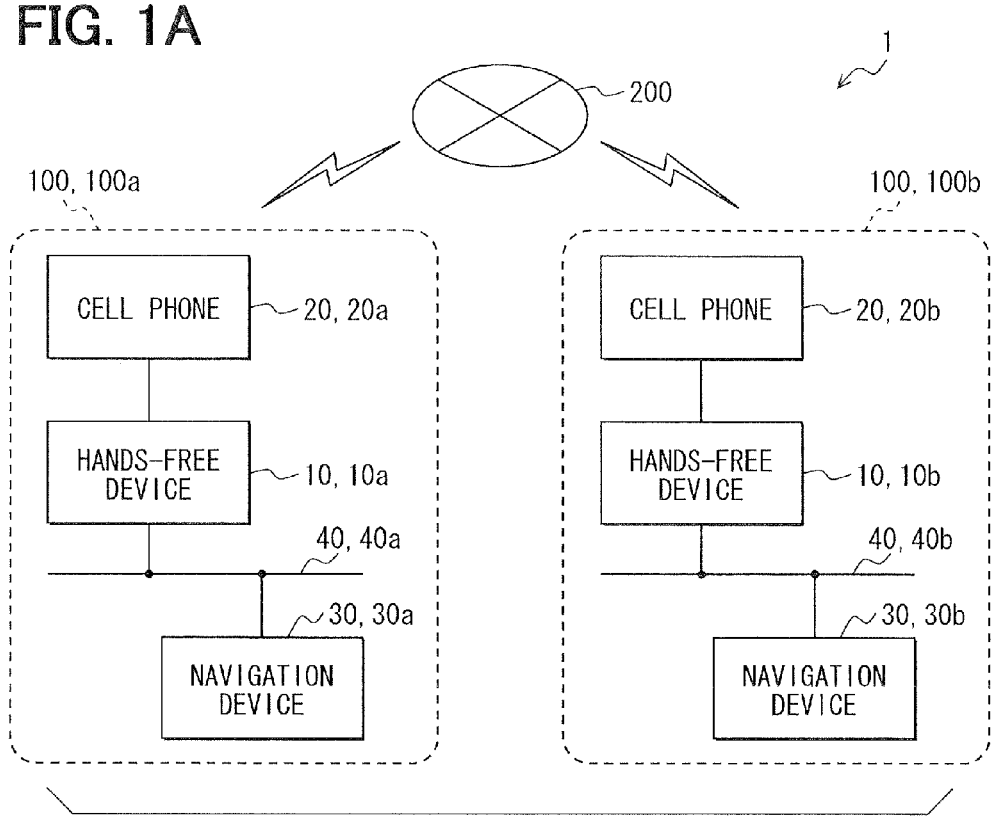
FIG. 1A is a schematic block diagram of a communication system according to a first embodiment.

First, a structure of a communication system according to a first embodiment will be described. FIG. 1A is a schematic block diagram illustrating a structure of a communication system 1 according to the first embodiment. The communication system 1 includes multiple in-vehicle systems 100, such as a first in-vehicle system 100a and a second in-vehicle system 100b, which enable users to communicate with each other without holding cell phones in their hands. Such a communication is generally referred to as a hands-free communication.

Each in-vehicle system 100 includes a cell phone 20, a hands-free device 10, and a navigation device 30. The cell phone 20 transmits and receives various information and conducts communication through a wireless communication network 200. The hands-free device 10 is mounted in a vehicle, and enables the hands-free communication utilizing a speaker (not shown) and a microphone (not shown) while communicating with the cell phone 20. The navigation device 30 is connected to the hands-free device 10 through an in-vehicle LAN 40.

In FIG. 1, for the purpose of clarity, the cell hone 20, the hands-free device 10, the navigation device 30, and the in-vehicle LAN 40 of the first in-vehicle system 100a are designated with reference numerals 20a, 10a, 30a, 40a, respectively. Likewise, the cell phone 20, the hands-free device 10, the navigation device 30 and the in-vehicle LAN 40 of the second in-vehicle system 100b are designated with reference numerals 20b, 10b, 30b, 40a, respectively.

Figure 1B:
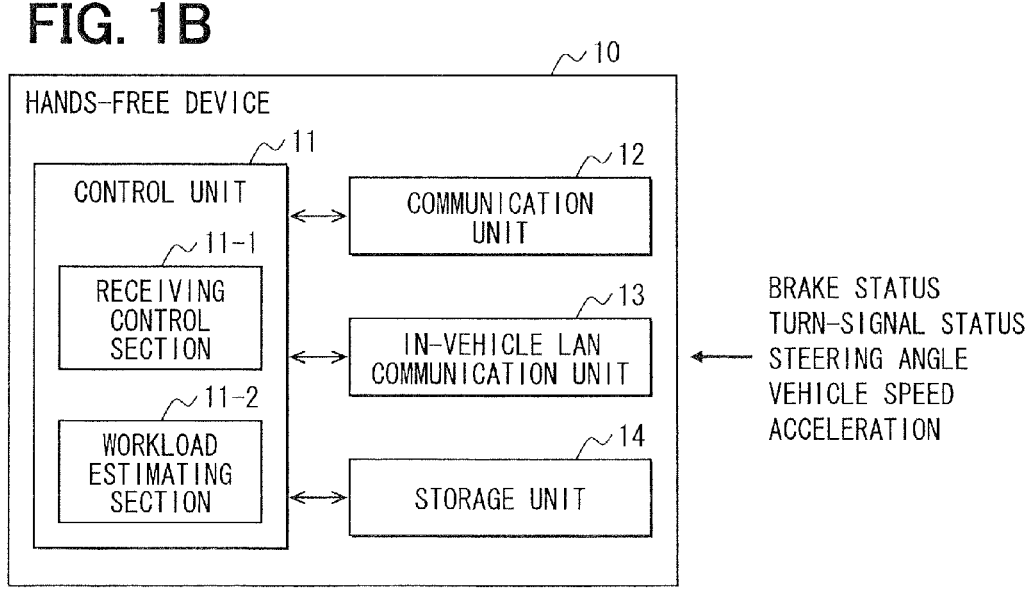
FIG. 1B is a schematic block diagram of a hands-free device of the communication system according to the first embodiment.

As shown in FIG. 1B, the hands-free device 10 includes a control unit 11, a communication unit 12, an in-vehicle LAN communication unit 13, and a storage unit 14. The control unit 11 includes a microcomputer having a CPU, a ROM, an I/O part and bus lines connecting the CPU, the ROM, and the I/O part, as a main component. The control unit 11 controls the hands-free device 10 in accordance with a program stored in the ROM. The communication unit 12 conducts communication with the cell phone 20 through a wireless communication device, such as by means of Bluetooth™. The in-vehicle LAN communication unit 13 conducts communication with the navigation device 30 and the like through the in-vehicle LAN 40. The storage device 14 is constructed of a hard disc drive (HDD) and a device which does not require a memory holding operation, such as a flash memory, and can store various information.

The hands-free device 10 is configured to initiate the hands-free communication between a driver of a vehicle (e.g., the own vehicle) in which the hands-free device 10 is mounted and a driver of another vehicle when workloads of both drivers, which are perception loads that the drivers undergo during driving operations, are lower than a predetermined level. For example, the hands-free device 10 is configured to initiate the hands-free communication between the drivers when the workloads of both the drivers are lower than the predetermined level for a predetermined time period.

For example, the program of the control unit 11 includes a workload estimation section 11-2 that estimates a change in workload of the driver of the own vehicle from a current time to a predetermined future time, and a receiving control section 11-1 that controls a timing of informing an incoming call to the cell phone 20 so as to begin the hands-free communication when the driver's workloads of both the vehicles are lower than the predetermined level.

The hands-free device 10 acquires various information regarding the vehicle, such as a brake status, a turn-signal status, a steering angle, a vehicle speed, an acceleration and the like, from various devices of the vehicle via the in-vehicle LAN 40. The hands-free device 10 detects a current workload based on the acquired vehicle information.

[Operation]

Next, an operation of the communication system 1 according to the first embodiment will be described. In the communication system 1, as described above, when a phone call is made from one in-vehicle system 100 (e.g., the first in-vehicle system) mounted in a first vehicle to another in-vehicle system 100 (e.g., the second in-vehicle system) mounted in a second vehicle, the communication can be initiated at a simultaneous low-load state (period) where the workloads of a first driver of the first vehicle and a second driver of the second vehicle are lower than the predetermined level for a predetermined period of time. In each of the in-vehicle systems 100, the hands-free device 10 estimates the change in the workload of the driver from the current time to the future time.

When a phone call is made from the cell phone 20 of the first in-vehicle system 100 to the cell phone 20 of the second in-vehicle system 100, the simultaneous low-load state where the workloads of the first and second drivers of the first and second vehicles are lower than the predetermined level for the predetermined period of time is detected based on the estimation results. In the second in-vehicle system 100, the incoming call is informed after the simultaneous low-load state has begun so that the communication can be initiated in the simultaneous low-load period.

(1) Workload Estimation

First, a workload estimation performed in the workload estimation section 11-2 will be described.

The storage section 14 of the hands-free device 10 stores correlation data indicating a correlation between a driving operation taken by a driver when the driver operates a vehicle along a predetermined route and a workload of the driver that the driver experiences during the driving operation, i.e., when operating the vehicle along the predetermined route. The driving operation includes an operation to go straight ahead, an operation to turn a curve with a predetermined radius of curvature, an operation to turn right at a traffic intersection, an operation to turn left at a traffic intersection, an operation to merge into a main line, and the like. In the correlation data, the workload that the driver experiences during each operation is determined. The workload may be determined separately depending on the kinds of road, such as a road type including a general road and an express way, the number of lanes of a road, and a road width.

The control section 11 acquires planned travel route data indicating a planned travel route of the own vehicle from the navigation device 30 via the in-vehicle LAN 40. For example, the planned travel route may be an estimated route that is estimated based on a past travel record of a user and that the own vehicle probably travels, such as a travel route taken when the user commutes to work. As another example, in a case where a route-assistance to a predetermined destination is made by the navigation device 30, the planned travel route may be the route made by the navigation device 30. Further, the planned travel route data may indicate the kind of roads constituting the planned travel route, in addition to or alternative to the planned travel route.

When receiving the planned travel route data, the control section 11 estimates a change in a workload in a traveling period when the own vehicle travels the planned travel route based on the planned travel route data and the correlation data, and generates workload information indicating an estimation result.

Figure 2A:
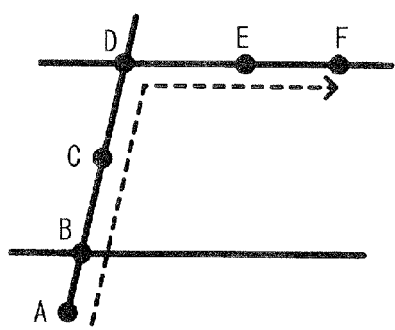
FIG. 2A is an explanatory view illustrating an example of a travel route used in a workload estimation of the communication system according to the first embodiment.
Figure 2C:
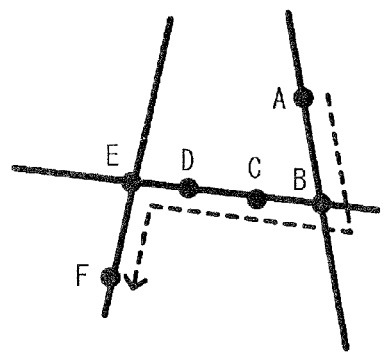
FIG. 2C is an explanatory view illustrating another example of a travel route used in a workload estimation of the communication system according the first embodiment.
Figure 2B:
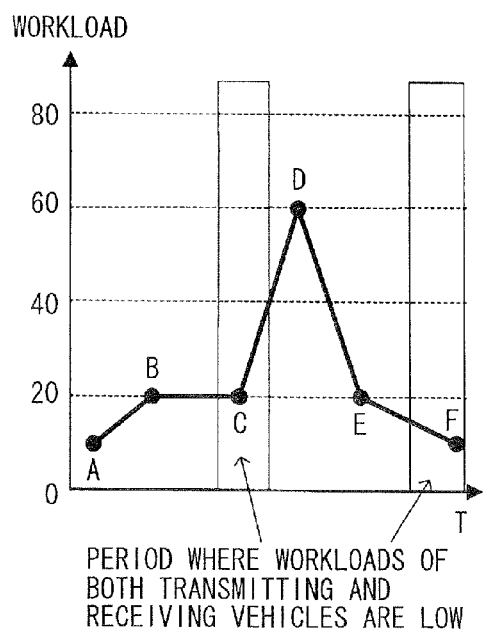
FIG. 2B is a graph illustrating a workload estimated based on the travel route shown in FIG. 2A.

For example, in a case where the planned travel route of the planned travel route data indicates a route shown in FIG. 2A, an estimation result shown in FIG. 2B is obtained as the change in the workload during a traveling period from a point A to a point F. In the planned travel route shown in FIG. 2A, the own vehicle goes straight from the point A to a point D, turns right at the point D, and goes straight from the point D to a point F. In a section from the point A to a point C, the workload indicates a low value, such as from 10 to 20, due to a straight drive operation. At the point D, the workload increases to 60 due to a turn right operation. At a point E and the point F, the workload reduces to a low value, such as from 10 to 20, due to a straight drive operation. It is to be noted that a road width at the points B, C, and E is smaller than that at the points A and F. Therefore, the workloads at the points B, C, E are relatively higher than the workloads of the points A and F, despite the similar straight drive operation.

Figure 2D:
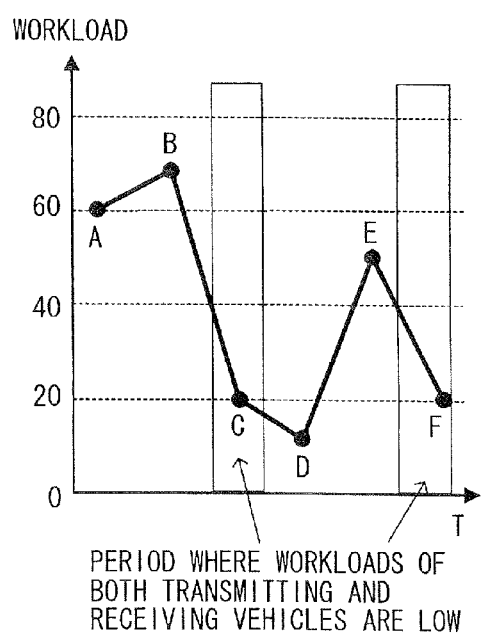
FIG. 2D is a graph illustrating a workload estimated based on the example of the travel route shown in FIG. 20.

In a case where the planned travel route of the planned travel route data indicates a route shown in FIG. 2C, an estimation result shown in FIG. 2D is obtained as the change in the workload during the traveling period from the point A to the point F. In the planned travel route shown in FIG. 2C, the own vehicle goes straight from the point A to the point B, turns right at the point B, goes straight from the point B to the point E, turns left at the point E, and goes straight from the point E to the point F.

At the point A, the road is a single lane road, though the road is straight. Therefore, the workload at the point A indicates a high value, such as 60. The workload further increases to 70 at the point B due to a turn right operation. At the points D and E, the workload indicates a low value, such as from 10 to 20, due to a straight drive operation. The workload increases to 50 at the point E due to a turn left operation, and reduces to 20 at the point F due to the straight drive operation.

Assuming that the estimation results of two in-vehicle systems 100, such as the first in-vehicle system 100a and the second in-vehicle system 100b, which communicate each other, indicate the workloads shown in FIGS. 2B and 2D, respectively, periods where the two vehicles pass through the point(s) C and/or the point(s) F are detected as the simultaneous low-load period.

(2) Control of Communication Initiation Timing

Next, a control of an initiating timing of hands-free communication between a first in-vehicle system 100 and a second in-vehicle system 100 will be described.

When the phone call is made from the cell phone 20 of the first in-vehicle system 100 (also referred to as a transmitting-side cell phone 20, and a transmitting-side in-vehicle system 100, respectively) to the cell phone 20 of the second in-vehicle system 100 (also referred to as a receiving-side cell phone 20 and a receiving-side in-vehicle system 100, respectively), the following processing is performed to initiate the hands-free communication between the first and second in-vehicle systems 100a, 100b.

(2-1) Transmitting Processing

A transmitting processing performed in the transmitting-side in-vehicle system 100 for controlling the timing to initiate the hands-free communication will be described with reference to a flowchart shown in FIG. 3. It is to be noted that the transmitting processing is begun at a time of starting an operation of the vehicle (transmitting-side vehicle) having the transmitting-side in-vehicle system 100.

At S305, the control unit 11 of the hands-free device 10 (transmitting-side hands-free device) of the transmitting-side in-vehicle system estimates a change in a workload of the transmitting-side driver that the transmitting-side driver experiences during a transmitting-side traveling period where the transmitting-side vehicle travels the planned travel route, based on the planned travel route data acquired from the navigation device 30, in the manner described in the above (1).

At S310, the control unit 11 determines whether or not the transmitting-side hands-free device or the transmitting-side cell phone terminal is operated to make a phone call to the receiving-side cell phone. When the determination result is "Yes" at S310, the processing proceeds to S315. When the determination result is "No" at S310, the processing proceeds to S305.

At S315, the control unit 11 estimates the change in the workload of the driver during the traveling period where the transmitting-side vehicle travels the planned travel route indicated by the planned travel route data based on the planned travel route data acquired from the navigation device 30 in the manner described in the above (1), and generates the workload information indicating the estimation result. In such a case, for example, the control unit 11 may estimate the change in the workload of the driver during the traveling period after the phone call is made at S310. Then, the processing proceeds to S320.

At S320, a calling signal for requesting communication is transmitted from the transmitting-side cell phone to the receiving-side cell phone. In this case, the control unit 11 of the transmitting-side hands-free device transmits the generated workload information to the hands-free device 10 (also referred to as a receiving-side hands-free device) of the receiving-side in-vehicle system through the transmitting-side cell phone. Then, the processing proceeds to S325.

At S325, the transmitting-side cell phone and the control unit 11 are in a calling state waiting for that the receiving-side in-vehicle system answers the call, that is, a state waiting for a response signal indicating that the receiving-side in-vehicle system comes in line. At S330, the control unit 11 determines whether or not the response signal has been received. When the response signal has been received at S330, corresponding to "Yes" at S330, the processing proceeds to S335. When the response signal has not been received at S330, corresponding to "No" at S330, the processing returns to S325.

At S335, the control unit 11 determines whether or not the transmitting-side cell phone has received the workload information generated in the receiving-side in-vehicle system together with the response signal from the receiving-side cell phone. When the determination result is "Yes" at S335, the processing proceeds to S340. When the determination result is "No" at S335, the processing proceeds to S350.

At S340, the control unit 11 detects the simultaneous low-load period where the driver's workloads of the transmitting-side vehicle and the receiving-side vehicle are lower than the predetermined level, based on the transmitting-side workload information and the receiving-side workload information received from the receiving-side in-vehicle system. Then, the processing proceeds to S345.

At S345, the control unit 11 informs a waiting message that indicates a period of time until the detected simultaneous low-load period arrives, via a speaker or the like (not shown). When the simultaneous low-load period arrives, the processing proceeds to S350.

At S350, the control unit 11 permits to initiate the hands-free communication with the receiving-side in-vehicle system, and ends the transmitting processing.

(2-2) Receiving Processing

Figure 4:
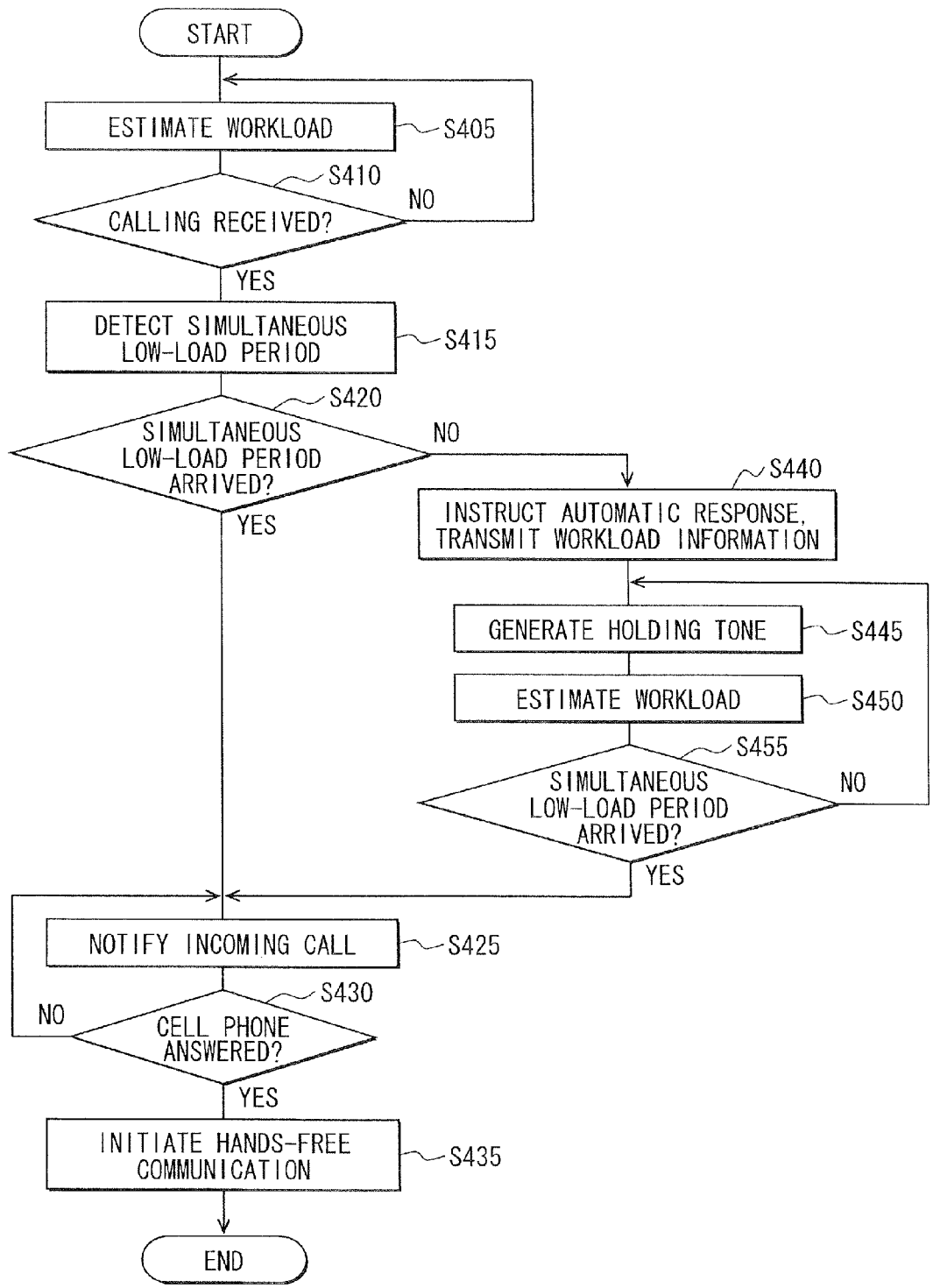
FIG. 4 is a flowchart illustrating a receiving processing of the communication system according to the first embodiment.

Next, a receiving processing performed in the receiving-side in-vehicle system to control the timing to initiate the hands-free communication will be described with reference to a flowchart shown in FIG. 4. The receiving processing is begun at a time of starting an operation of the receiving-side vehicle.

At S405, the control unit 11 of the receiving-side hands-free device estimates the change in the workload of the driver during the traveling period where the receiving-side vehicle travels the planned travel route indicated by the planned travel route data, based on the planned travel route data acquired from the navigation device 30, in the manner described in the above (1). Then, the processing proceeds to S410.

At S410, the control unit 11 determines whether or not the receiving-side cell phone has received a phone call request from the transmitting-side cell phone, that is, whether the receiving-side cell phone has the calling signal from the transmitting-side cell phone or not. When the determination result is "Yes" at S410, the processing proceeds to S415. When the determination result is "No" at S410, the processing returns to S405. It is to be noted that, when the receiving-side cell phone receives the phone call request, the receiving-side cell phone receives the workload information of the transmitting-side vehicle from the transmitting-side cell phone.

At S415, the control unit 11 acquires the workload information of the transmitting-side vehicle via the receiving-side cell phone, and detects the simultaneous low-load period where the workloads of the transmitting-side vehicle and the receiving-side vehicle are lower than the predetermined level, based on the acquired workload information of the transmitting-side vehicle and the workload information of the receiving-side vehicle. Then, the processing proceeds to S420.

At S420, the control unit 11 determines whether or not the simultaneous low-load period has arrived. When the determination result is "Yes" at S420, the processing proceeds to S425. When the determination result is "No" at S420, the processing proceeds to S440.

At S425, the control unit 11 permits the receiving-side cell phone to notify the driver of the receiving-side vehicle of the incoming call from the transmitting-side cell phone, such as by ringing the receiving-side cell phone or the like. Alternatively, the incoming calling may be notified using a speaker or the like of the receiving-side hands-free device. Then, the processing proceeds to S430.

At S430, the control unit 11 determines whether or not the receiving-side cell phone or the receiving-side hands-free device is operated to answer the incoming call, i.e., to begin the hands-free communication with the transmitting-side cell phone. When the determination result is "Yes" at S430, the processing proceeds to S435. When the determination result is "No" at S430, the processing returns to S425.

At S435, when the response signal to the transmitting-side cell phone has not been transmitted (i.e., the receiving-side cell phone has not been answered), the response signal is transmitted to the transmitting-side cell phone (i.e., the receiving-side cell phone is answered). Further, the control unit 11 initiates the hands-free communication with the transmitting-side in-vehicle system through a speaker, a microphone or the like (not shown). Then, the control unit 11 ends the receiving processing.

At S440, the control unit 11 transmits the response signal to the transmitting-side cell phone (i.e., the receiving-side cell phone is answered). The control unit 11 transmits the driver's workload of the receiving-side vehicle to the transmitting-side hands-free device through the receiving-side cell phone so as to make an automatic response for notifying the transmitting-side hands-free device of a delay of a notification timing of the incoming call in the receiving-side cell phone. Then, the processing proceeds to S445.

At S445, the control unit 11 controls the receiving-side cell phone to generate a holding tone so that the transmitting-side cell phone outputs the holding tone. Further, the control unit 11 newly receives the planned travel route data from the navigation device 30, and generates new workload information of the receiving-side vehicle traveling period where the receiving-side vehicle travels the planned travel route indicated by the planned travel route data. Then, the processing proceeds to S455.

At S455, the control unit 11 detects the simultaneous low-load period based on the generated workload information and the workload information of the transmitting-side vehicle, and determines whether the detected simultaneous low-load period has been arrived or not. When the determination result is "Yes" at S455, the processing proceeds to S425. When the determination result is "No" at S455, the processing returns to S445.

The steps of S415, S420, S455 and the like of the receiving processing are conducted by the receiving control section 11-1, for example.

According to the communication system 1 of the present embodiment, the hands-free communication between the transmitting-side in-vehicle system and the receiving-side in-vehicle system is begun in the simultaneous low-load period where the driver's workloads of the transmitting-side vehicle and the receiving-side vehicle are lower than the predetermined level for a predetermined period of time. Therefore, the hands-free communication can be performed in good time for the drivers of both the transmitting-side vehicle and the receiving-side vehicle.

In the present embodiment, the predetermined level used in the detection of the simultaneous low-load state is, for example, 30 in the example of FIGS. 2B and 2D. However, the predetermined level is not limited to 30, but may be optimally adjusted.

Second Embodiment

[Structure]

Figure 5A:
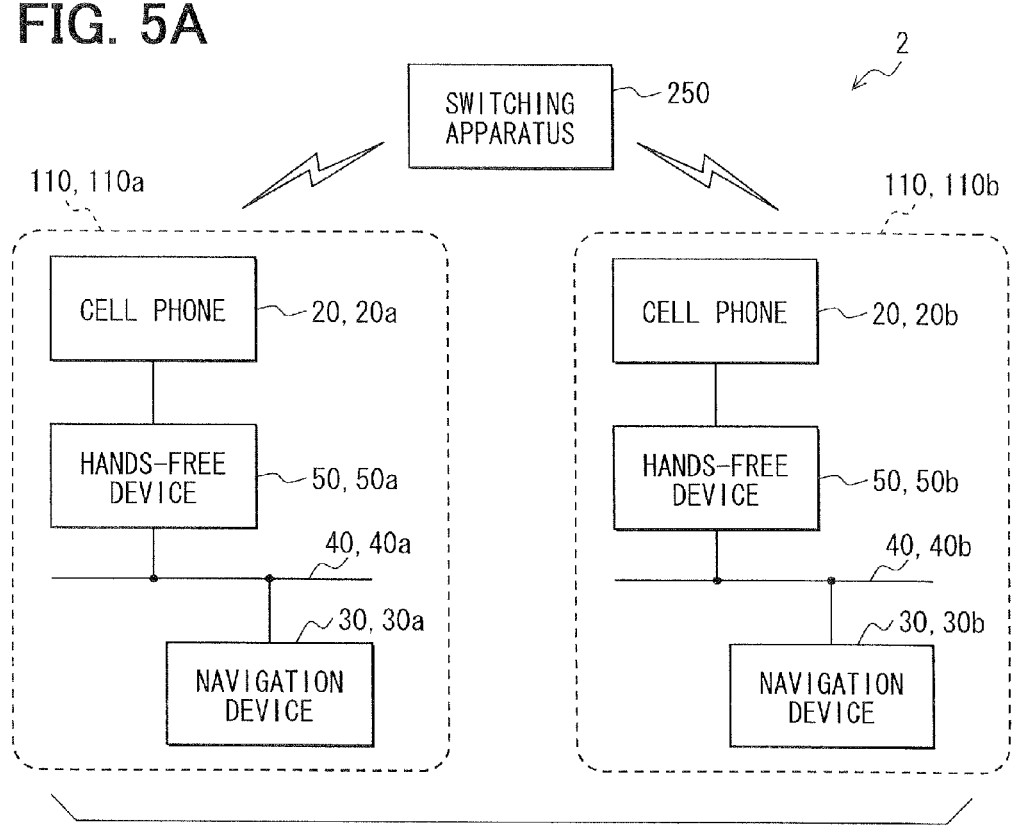
FIG. 5A is a schematic block diagram of a communication system according to a second embodiment.
Figure 5B:
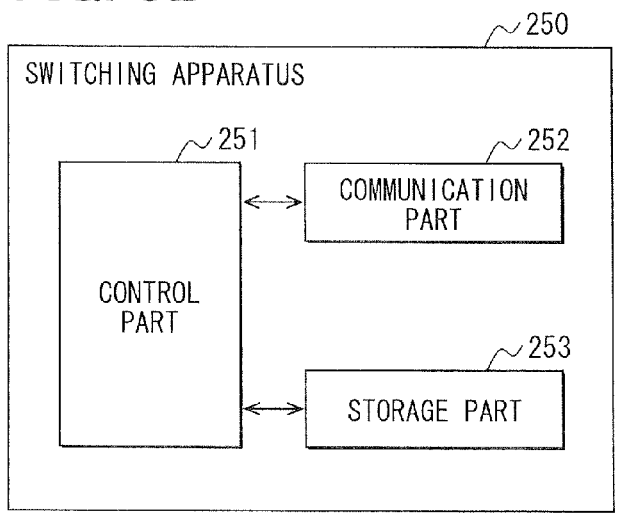
FIG. 5B is a schematic diagram of a switching apparatus of the communication system according to the second embodiment.

A structure of a communication system 2 according to a second embodiment will be described with reference to a block diagram shown in FIG. 5A. The communication system 2 is a system for conducting a hands-free communication. The communication system 2 includes in-vehicle systems 110, such as a first in-vehicle system 110a and a second in-vehicle system 110b, and a switching apparatus 250. Each of the in-vehicle systems 110 (110a, 110b) has a hands-free device 50 (50a, 50b), a cell phone 20 (20a, 20b), which is similar to the cell phone 20 of the first embodiment, and a navigation device 30 (30a, 30b). The switching apparatus 250 constitutes a part of a wireless communication network used for transmitting and receiving communication and various information between the cell phones 20 and connects communication lines between the cell phones 20 when the communication and various information are transmitted and received between the two cell phones 20.

The hands-free device 50 includes a control unit, a communication unit, an in-vehicle LAN communication unit and a storage unit, similar to the hands-free device 10 of the communication system 1 of the first embodiment. Further, the hands-free device 50 includes a workload estimation section as a program of the control unit. However, the hands-free device 50 is different from the hands-free device 10 of the first embodiment because the receiving control section for adjusting the timing of notifying the incoming call is not included in the control unit as the program of the control unit.

The switching apparatus 250 can communicate with a base station (not shown) that performs wireless communication with the cell phones 20. The switching apparatus 250 has communication with the cell phones 20 through the base station. The switching apparatus 250 includes a microcomputer constructed of a CPU, a ROM, an I/O part and bus lines connecting the CPU, the ROM, and the I/O part, as a main component. The switching apparatus 250 further includes a control part 251 for controlling the switching apparatus 250, a communication part 252 that conducts communication with the base station, and a storage part 253 that is constructed of a HDD and a device that does not require a storage holding operation such as a flash memory or the like and can store various information.

[Operation]

(1) General Operation

Next, an operation of the communication system 2 according to the present embodiment will be described. The communication system 2 is configured to initiate the hands-free communication between an in-vehicle system 110 mounted in one vehicle and an in-vehicle system 110 mounted in another vehicle in the simultaneous low-load period where the workloads of the drivers of both of the vehicles are low, similar to the first embodiment.

That is, in each of the in-vehicle systems 110, similar to the first embodiment, the hands-free device 50 generates the workload information, and the generated workload information is transmitted to the switching apparatus 250 through the cell phone 20. When a phone call is made from one in-vehicle system 110 to another in-vehicle system 110, the switching apparatus 250 detects the simultaneous low-load period between the vehicles having the in-vehicle systems 110 based on the workload information transmitted from the hands-free device 50 of each in-vehicle system 110, and controls the timing of informing the incoming call so that the hands-free communication is initiated in the simultaneous low-load period.

(2) Communication Initiating Processing

Figure 6:
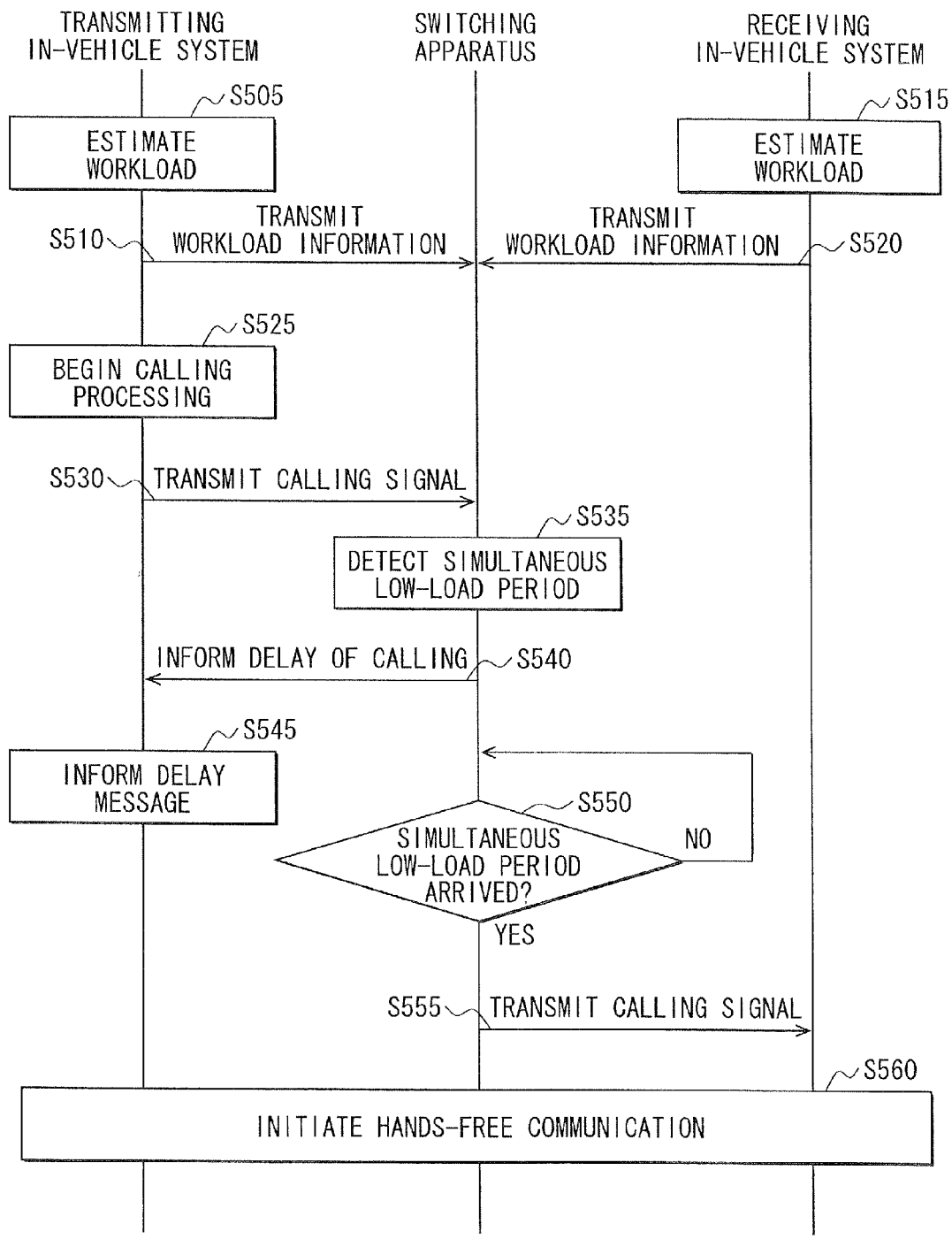
FIG. 6 is a sequence chart illustrating a communication initiating processing of the communication system according to the second embodiment.

Next, a communication initiating processing for controlling the timing of the incoming call so that the hands-free communication is initiated in the simultaneous low-load period will be described with reference to a sequence chart shown in FIG. 6. It is to be noted that the communication initiating processing is regularly performed in the communication system 2.

Hereinafter, one in-vehicle system 110 that makes a phone call to another in-vehicle system 110 can be also referred to as a transmitting-side in-vehicle system, and another in-vehicle system 110 that receives the phone call from the transmitting-side in-vehicle system can be also referred to as a receiving-side in-vehicle system.

At S505, similar to the first embodiment, the control unit of the hands-free device 50 (also referred to as the transmitting-side hands-free device) of the transmitting-side in-vehicle system acquires the planned travel route data from the navigation device 30 and estimates the change in the driver's workload in the transmitting-side traveling period where the own vehicle (also referred to as the transmitting-side vehicle) travels the planned travel route indicated by the acquired planned travel route data. The control unit generates the workload information indicating the estimation result.

At S510, the control unit transmits the generated workload information to the switching apparatus 250 through the cell phone 20 (also referred to as the transmitting-side cell phone) of the transmitting-side in-vehicle system. It is to be noted that the transmitting-side hands-free device generates the workload information at a regular timing, and transmits the generated workload information to the switching apparatus 250.

Also in the hands-free device 50 (also referred to as the receiving-side hands-free device) of the receiving-side in-vehicle system, at S515, the control unit acquires the planned travel route data of the own vehicle (also referred to as the receiving-side vehicle), estimates the change in the driver's workload of the own vehicle when the own vehicle travels the planned travel route indicated by the planned travel route data, and generates the workload information indicating the estimation result, similar to the transmitting-side hands-free device.

At S520, the control unit of the receiving-side hands-free device transmits the generated workload information to the switching apparatus 250 through the cell phone 20 (also referred to as the receiving-side cell phone) of the receiving-side in-vehicle system 110. It is to be noted that the receiving-side hands-free device generates the workload information at a regular timing and transmits the generated workload information to the switching apparatus 250, similar to the transmitting-side hands-free device.

When a calling instruction to make a phone call from the transmitting-side cell phone to the receiving-side cell phone is made in the transmitting-side hands-free device or the transmitting-side cell phone at 5525, a calling signal to request the calling to the receiving-side cell phone is transmitted to the switching apparatus 250 from the transmitting-side cell phone at S530.

When receiving the calling signal from the transmitting-side cell phone, the control part 251 of the switching apparatus 250 detects the simultaneous low-load period where the driver's workloads of both of the transmitting-side vehicle and the receiving-side vehicle are lower than the predetermined level, based on the workload information received from the transmitting-side hands-free device and the receiving-side hands-free device, at S535. If there is a time until the arrival of the simultaneous low-load period, the control part 251 notifies the transmitting-side cell phone that the incoming call to the receiving-side cell phone is delayed at S540. It is to be noted that the control part 251 may inform the transmitting-side cell phone of a period of time until the arrival of the simultaneous low-load period.

When the transmitting-side cell phone receives the delay information indicating the delay of the incoming call to the receiving-side cell phone, the transmitting-side hands-free device informs the driver of that the incoming call to the receiving-side cell phone is delayed through a speaker or the like (not shown), at S545. In a case where the transmitting-side cell phone is notified of the period of time until the arrival of the simultaneous low-load period from the switching apparatus 250, the transmitting-side hands-free device may inform the waiting time until the incoming call is accepted in the receiving-side vehicle based on the notified period of time.

At S550, the control part 251 of the switching apparatus 250 determines whether or not the simultaneous low-load period has been arrived. When the determination result is "Yes" at S550, the control part 251 transmits the calling signal to the receiving-side cell phone at S555.

At S560, when a predetermined receiving operation is made in the receiving-side cell phone or the receiving-side hands-free device in accordance with the calling signal to answer the incoming call, the hands-free communication between the transmitting-side in-vehicle system and the receiving-side in-vehicle system is initiated.

According to the communication system 2 of the present embodiment, the hands-free communication between the transmitting-side in-vehicle system and the receiving-side in-vehicle system is initiated in the simultaneous low-load period where the driver's workloads of the transmitting-side vehicle and the receiving-side vehicle are lower than the predetermined level for a predetermined period of time. Therefore, the hands-free communication can be performed in good time for the drivers of both the transmitting-side vehicle and the receiving-side vehicle.

Also in the present embodiment, the predetermined level used in the detection of the simultaneous low-load state is, for example, 30 in the example of FIGS. 2B and 2D. However, the predetermined level is not limited to 30, but may be optimally adjusted.

Third Embodiment

[Structure]

An in-vehicle system according to a third embodiment will be described. The in-vehicle system according to the third embodiment is a system to conduct a hands-free communication, and includes the hands-free device 50, the cell phone 20 and the navigation device 30, similar to those of the second embodiment.

[Operation]

Next, an operation of the in-vehicle system according to the third embodiment will be described. The in-vehicle system is configured that, when a phone call is made from the cell phone 20 of the in-vehicle system, the hands-free communication is initiated during a low-load period where a workload of the driver of the own vehicle is lower than the predetermined level for a predetermined period of time.

Hereinafter, a transmission initiating processing to control the timing of initiating the hands-free communication in the low-load period, when the phone call is made from the cell phone of the in-vehicle system, will be described with reference to FIG. 7. It is to be noted that the transmission initiating processing is started at a time of starting an operation of the own vehicle having the in-vehicle system.

At S605, the control unit of the hands-free device 50 acquires the planned travel route data from the navigation device 30, estimates the change in the workload of the driver of the own vehicle during the traveling period where the own vehicle travels the planned travel route based on the acquired planned travel route data, and generates workload information indicating the estimation result, similar to the first embodiment. Then, the processing proceeds to S610.

At S610, the control unit determines whether or not the hands-free device or the cell phone has been instructed or operated to make a phone call to another phone. When the determination result is "Yes" at S610, the processing proceeds to S615. When the determination result is "No" at S610, the processing returns to S605.

At S615, the control unit estimates the change in the workload of the driver of the own vehicle during the traveling period where the own vehicle travels the planned travel route indicated by the planned travel route data acquired from the navigation device 30, and generates the workload information. Then, the processing proceeds to S620.

At S620, the control unit determines whether the low-load period where the workload of the own vehicle is lower than the predetermined level for the predetermined period of time has arrived or not, based on the workload information generated at S615. When the determination result is "Yes" at S620, the processing proceeds to S630. When the determination result is "No" at S620, the processing proceeds to S625.

At S625, the control unit informs a transmission waiting message indicating the delay of the transmission of the calling signal requesting a communication with another phone, through a speaker or the like. In this case, it is to be noted that the period of time until the calling signal is transmitted, that is, until the arrival of the low-load period may be informed. Then, the processing returns to S615.

At S630, the control unit controls the cell phone 20 to transmit the calling signal. Then, the processing proceeds to S635.

At S635, the control unit and the cell phone 20 are in a calling state waiting for a response signal from another phone, that is, waiting that another phone answers the phone call from the cell phone 20. Then, the processing proceeds to S640.

At S640, the control unit determines whether or not the cell phone 20 has received the response signal from another phone. When the determination result is "Yes" at S640, the processing proceeds to S645. When the determination result is "No" at S640, the processing returns to S635.

At S645, the control unit initiates the hands-free communication with another phone through a speaker and a microphone (not shown). Then, the transmission initiating processing is ended.

According to the in-vehicle system of the present embodiment, the hands-free communication is begun after the low-load period where the workload of the driver of the own vehicle is lower then the predetermined level for a predetermined period of time has been arrived. Therefore, the hands-free communication can be performed in good time for the driver.

Also in the present embodiment, the predetermined level used for the detection of the low-load period is, for example, 30 in the example shown in FIGS. 2B and 2D. However, the predetermined level is not limited to 30, but may be adjusted to an optimal level.

Other Embodiments

In the communication system 1 according to the first embodiment, the hands-free device 10 generates the workload information, transmits the workload information, and controls the timing of notifying the incoming call. However such operations may be conducted in other devices. For example, such operations may be conducted by the navigation device 30. As another example, such operations may be conducted by another device(s) provided separately from the hands-free device 10 and the navigation device 30. Also in such cases, the similar advantageous effects can be achieved.

Also in the in-vehicle systems of the second and third embodiments, the generation of the workload information and the like are conducted by the hands-free device 10. Alternatively, such operations may be conducted in the navigation device or another device(s) provided separately from the hands-free device and the navigation device. Also in such cases, the similar advantageous effects can be achieved.

In the above embodiments, the cell phones 20 exemplary correspond to communication terminals. The calling signal and the incoming call signal exemplarily correspond to communication requests. The hand-free device 10, 50 exemplarily corresponds to a communication device mounted in a vehicle. However, the communication device may be constructed by the hands-free device 10, 50 and other devices.

That is, it is not always necessary that all the functions of the control unit are included in the hands-free device 10.

In the first embodiment, for example, the control unit 11 includes a workload information generating element that generates the workload information, a workload information transmitting element that permits the cell phone to transmit the workload information to another cell phone, a workload information acquiring element that acquires the workload information generated in another communication device, a low-load period detecting element that detects the simultaneous low-load period, and an incoming call notifying element that notifies the driver of the incoming call on condition that the simultaneous low-load period arrives. For example, the workload estimation section 11-2 as the program of controlling the control unit 11 includes the workload information generating element. Also, the receiving control section 11-1 as the program of controlling the control unit 11 includes the simultaneous low-load state detecting element and the incoming call notifying element.

In the second embodiment, for example, the control unit of the hands-free device includes a workload information generating element that generates the workload information and a workload information transmitting element that permits the cell phone to transmit the workload information generated by the workload information generating element to the switching apparatus. The control part 251 of the switching apparatus 250 includes a workload information receiving element that receives the workload information from the communication devices through the cell phones, a low-load period detecting element that detects the simultaneous low-load period, and an initiation timing control element that transmits a communication request transmitted from one communication terminal to another communication terminal on condition that the simultaneous low-load period arrives. For example, the communication part 252 of the switching apparatus 20 includes the workload information receiving element. Also, the notification indicating the delay of the calling acceptance transmitted at S540 corresponds to delay information.

In the third embodiment, for example, the control unit of the hands-free device 50 includes a workload information generating element that generates the workload information, a low-load period detecting element that detects the low-load period, and a transmitting element that permits the communication terminal to transmit the calling signal on condition that the low-load period arrives.

In the first embodiment, the timing to initiate the hands-free communication is determined in the receiving-side hands-free device. Alternatively, the timing to initiate the hands-free communication can be determined in the transmitting-side communication unit.

For example, when a phone call is made from the transmitting-side communication terminal to the receiving-side communication terminal, a message indicating a communication request is transmitted to a receiving-side communication unit. When receiving the message, the receiving-side communication unit transmits the workload information of the receiving-side vehicle to the transmitting-side communication unit. The transmitting-side communication unit detects the simultaneous low-load period where the driver's workload of the transmitting-side vehicle and the driver's workload of the receiving-side vehicle are lower than the predetermined level, based on the workload information of the transmitting-side vehicle and the workload information of the receiving-side vehicle. Then, when the simultaneous low-load period arrives, the phone call from the transmitting-side cell phone is connected to the receiving-side cell phone. In such a case, the transmitting-side communication unit may notify the receiving-side communication unit of the delay of the incoming call to the receiving-side cell phone.

In the above embodiments, the workload information of the transmitting-side vehicle and the workload information of the receiving-side vehicle are generated based on the planned travel route data of the transmitting-side communication unit and the planned travel route data of the receiving-side communication unit, respectively. As another example, workload information may be generated in a real-time as transmitting the calling request from the transmitting-side communication unit to the receiving-side communication unit. For example, the workload information may be generated based on the workload at the time when the calling request is transmitted. A workload state (e.g., simultaneous low-load state) whether or not the workloads of the transmitting-side driver and the receiving-side driver are lower than the predetermined level may be detected based on the workload information that is generated in the real-time. As further another example, the workload state (e.g., simultaneous low-load state) may be detected based on both the workload information generated based on the planned travel route data and the workload information generated in the real-time.

Accordingly, in an embodiment, a communication system includes a first communication unit disposed in a first vehicle and a second communication unit disposed in a second vehicle for conducting wireless communication between the first vehicle and the second vehicle. The first communication unit includes a first workload information generating element that generates first workload information indicating a first workload that a first driver of the first vehicle undergoes when operating the first vehicle. The second communication unit includes a second workload information generating element that generates second workload information indicating a second workload that a second driver of the second vehicle undergoes when operating the second vehicle.

The communication system further includes a workload state determining element and an incoming call notifying element. The workload state determining element determines whether or not the first workload and the second workload are lower than a predetermined level based on the first workload information and the second workload information, when the first communication unit generates a communication request for requesting communication with the second communication unit. The incoming call notifying element notifies the second driver of an incoming call on condition that the first workload and the second workload are determined lower than the predetermined level by the workload state determining element.

In such a construction, the incoming call is notified on condition that the first workload and the second workload are lower than the predetermined level. Therefore, communication between the first driver and the second driver is initiated in a good time for the first driver and the second driver, similar to the first and second embodiments. In the embodiment, the simultaneous low-load state may be determined in the first communication unit or the second communication unit. Further, the simultaneous low-load state may be determined in the switching apparatus disposed external to the first communication unit and the second communication unit.

Figure 7:
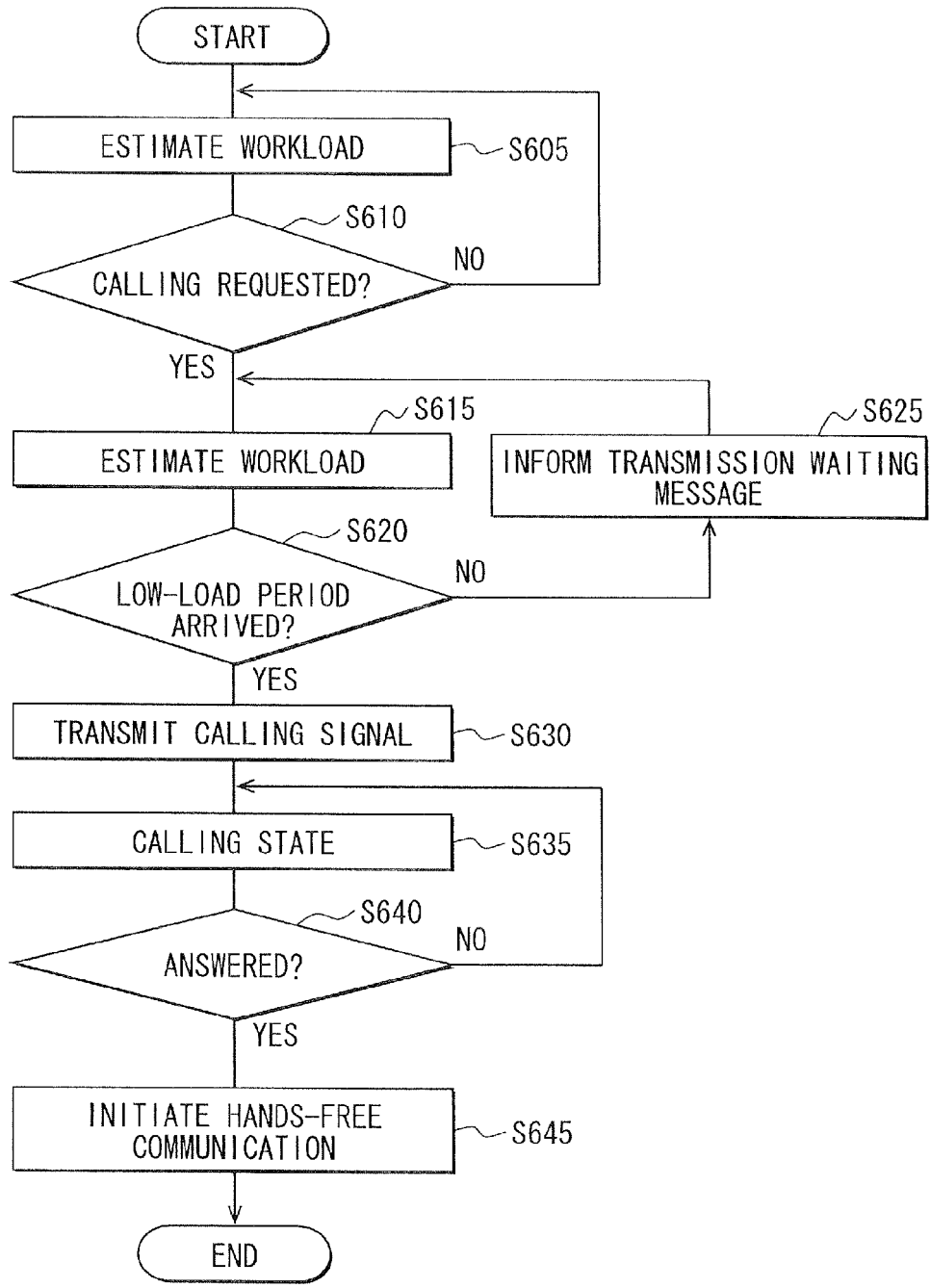
FIG. 7 is a flowchart illustrating a transmission initiating processing of a communication system according to a third embodiment.

In the embodiments shown in FIGS. 3 and 7, the workload is estimated before and after the determination of the calling request. However, it is not always necessary to estimate the workload before and after the determination of the calling request. Further, the workload information may be generated based on the workload estimated after the calling request is made.

Additional advantages and modifications will readily occur to those skilled in the art. The invention in its broader term is therefore not limited to the specific details, representative apparatus, and illustrative examples shown and described.

What is claimed is:

1. A communication system for conducting wireless communication between a first vehicle and a second vehicle, comprising:
a first communication unit disposed in the first vehicle including a first communication device connected to a first communication terminal;
a second communication unit disposed in the second vehicle including a second communication device connected to a second communication terminal;
a first workload information generating element disposed in the first communication unit, the first workload information generating element determines a first workload information based on a first planned travel route, a first driver's current operation, and a correlation between the first planned travel route and the driver's current operation;
a second workload information generating element disposed in the second communication unit, the second workload information generating element determines a second workload information based on a second planned travel route, a second driver's current operation, and a correlation between the second planned travel route and the second driver's current operation information;
a workload state determining element that determines whether a simultaneous low-load period has been received after the first communication unit generates a communication request, the simultaneous low-load period being the first workload information and the second workload information are lower than a predetermined level for a predetermined period of time: and
an incoming call notifying element that notifies the second driver of an incoming call only when the simultaneous low-load period has arrived, wherein when the communication request is transmitted from the first communication terminal to the second communication terminal, the first communication device permits the first communication terminal to transmit the first workload information, and the second communication device uses the workload state determining element to determine whether the simultaneous low-load period arrives, and uses the notifying element to notify the second driver of an incoming call on condition that the simultaneous low-load period has arrived.

2. The communication system according to claim 1, further comprising:
a workload information acquiring element that acquires the workload information together with the communication request, wherein
when the first communication unit generates the communication request, the second communication unit uses the workload information acquiring element to acquire the first workload information together with the communication request, and uses the workload state determining element to determine whether the simultaneous low-load period arrives.

3. The communication system according to claim 1, wherein
the second communication device permits the second communication terminal to transmit the second workload information to the first communication terminal, when the workload state determining element determines that the simultaneous low-load period is not arrived, and
the first communication device detects the simultaneous low-load period using the workload state determining element when the first communication terminal receives the second workload information from the second communication device, and notifies the first driver of a period of time until the simultaneous low-load period arrives.

4. The communication system according to claim 1, further comprising:
a switching apparatus that is disposed external to the first vehicle and the second vehicle, the switching apparatus permitting to initiate wireless communication between the first communication unit and the second communication unit, wherein
the first communication device permits the first communication terminal to transmit the first workload information to the switching apparatus,
the second communication device permits the second communication terminal to transmit the second workload information to the switching apparatus,
when the first communication terminal transmits the communication request to the switching apparatus, the switching apparatus detects the arrival of the simultaneous low-load period using the workload state determining element, and transmits the communication request to the second communication terminal on condition that the simultaneous low-load period has arrived.

5. The communication system according to claim 4, wherein
the switching apparatus transmits delay information to the first communication terminal, the delay information indicating delay of transmission of the communication request to the second communication terminal due to the simultaneous low-load period being not arrived, and
the first communication device notifies the first driver of the delay of the transmission of the communication request to the second communication terminal when the first communication terminal receives the delay information.

6. A communication device to be mounted in a first vehicle and connected to a first communication terminal that conducts wireless communication with a second communication terminal, which is connected to another communication device mounted in a second vehicle, the communication device comprising:
a workload information generating element that generates workload information based on a planned travel route, a driver's current operation, and a correlation between the planned travel route and the driver's current operation;
a workload information acquiring element that acquires a workload information regarding a driver of the second vehicle via the first communication terminal, when the first communication terminal receives a communication request from the second communication terminal;
a low-load period detecting element that detects a simultaneous low-load period where the workload of the driver of the first vehicle after the first communication terminal receives the communication request from the second communication terminal and the workload of the driver of the second vehicle are lower than a predetermined level for a predetermined period of time; and
an incoming call notifying element that notifies the driver of the first vehicle of an incoming call on condition that the simultaneous low-load period arrives.

7. A switching apparatus for initiating wireless communication between at least first and second communication terminals, the first communication terminal being connected to a first communication device mounted in a first vehicle, the second communication terminal being connected to a second communication device mounted in a second vehicle, the switching apparatus comprising:
- a workload information receiving element that receives workload information generated in the first and second communication devices through the first and second communication terminals, respectively, the workload information indicating a change in a workload that a driver undergoes when operating a corresponding vehicle along a planned travel route;
- a low-load period detecting element that detects a simultaneous low-load period where the workload of the first vehicle and the workload of the second vehicle are lower than a predetermined level for a predetermined period of time based on the workload information received by the workload information receiving element, when receiving a communication request transmitted from the first communication terminal for requesting initiation of communication with the second communication terminal; and
    - an initiation timing control element that transmits the communication request to the second communication terminal on condition that the simultaneous low-load period arrives.

8. A communication device to be mounted in a vehicle and connected to a communication terminal that conducts wireless communication with another communication terminal, the communication device comprising:
- a workload information generating element that generates workload information based on a planned travel route, a driver's current operation, and a correlation between the planned travel route and the driver's current operation
- a low-load period detecting element that detects a low-load period where the workload of the driver is lower than a predetermined level for a predetermined period of time based on the workload information, when an instruction to transmit a communication request for initiating communication with another communication terminal from the communication terminal is made; and
- a transmitting element that permits the communication terminal to transmit the communication request on condition that the low-load period arrives.

9. The communication device according to claim 8, further comprising:
- a notifying element that notifies the communication terminal of a period of time until the low-load period arrives.

* * * * *